United States Patent
Schwarz et al.

(10) Patent No.: US 12,033,280 B2
(45) Date of Patent: Jul. 9, 2024

(54) METHOD AND APPARATUS FOR GENERATING A 3D RECONSTRUCTION OF AN OBJECT

(71) Applicant: Carl Zeiss Vision International GmbH, Aalen (DE)

(72) Inventors: Oliver Schwarz, Ellwangen (DE); Lars Omlor, Pleasanton, CA (US)

(73) Assignee: Carl Zeiss Vision International GmbH, Aalen (DE)

( * ) Notice: Subject to any disclaimer, the term of this patent is extended or adjusted under 35 U.S.C. 154(b) by 258 days.

(21) Appl. No.: 16/860,006

(22) Filed: Apr. 27, 2020

(65) Prior Publication Data

US 2020/0258300 A1 Aug. 13, 2020

Related U.S. Application Data

(63) Continuation-in-part of application No. PCT/EP2019/086326, filed on Dec. 19, 2019.

(30) Foreign Application Priority Data

Dec. 20, 2018 (EP) ..................................... 18214974

(51) Int. Cl.
  *G06T 17/20* (2006.01)
  *G06T 7/11* (2017.01)
  *G06T 7/13* (2017.01)

(52) U.S. Cl.
  CPC ................ *G06T 17/20* (2013.01); *G06T 7/11* (2017.01); *G06T 7/13* (2017.01);
  (Continued)

(58) Field of Classification Search
  None
  See application file for complete search history.

(56) References Cited

U.S. PATENT DOCUMENTS 6,462,835 B1 * 10/2002 Loushin .................. G06T 5/009
  358/1.9
6,990,228 B1 * 1/2006 Wiles ...................... G06T 17/10
  345/419

(Continued)

FOREIGN PATENT DOCUMENTS

CN 201210495803 * 6/2014
DE 19853120 C1 * 9/2001 ......... G01N 21/5907

(Continued)

OTHER PUBLICATIONS

English-language translation of the Written Opinion issued in PCT/EP2019/086326, to which this application claims priority, mailed Feb. 13, 2020.

(Continued)

*Primary Examiner* — Saptarshi Mazumder
(74) *Attorney, Agent, or Firm* — Tautz & Schuhmacher LLC; Georg M. Hasselmann (57) ABSTRACT

The generation of a 3D reconstruction of an object is disclosed, which includes illuminating the object, capturing image data in relation to the object, and calculating the 3D reconstruction of the object from the image data. The image data contains first image data and second image data, wherein the first image data are captured when the object is illuminated with illumination light, at least some of which, in relation to an object imaging beam path, is reflected light which illuminates the object, wherein the second image data are captured from different recording directions when the object is illuminated with illumination light, at least some of which is guided in the object imaging beam path, and wherein the 3D reconstruction of the object is calculated from the first image data and the second image data.

20 Claims, 4 Drawing Sheets

(52) U.S. Cl.
CPC ............... *G06T 2207/10024* (2013.01); *G06T 2207/10028* (2013.01); *G06T 2207/20081* (2013.01); *G06T 2207/20084* (2013.01)

(56) References Cited

U.S. PATENT DOCUMENTS

| | | | |
|---|---|---|---|
| 9,357,204 B2 | 5/2016 | Dehais et al. | |
| 2002/0159628 A1* | 10/2002 | Matusik | G06T 7/557 382/154 |
| 2008/0123052 A1* | 5/2008 | Su | A61B 3/0008 351/221 |
| 2010/0278413 A1* | 11/2010 | Jarisch | G06T 11/006 382/131 |
| 2015/0362761 A1 | 12/2015 | Adler et al. | |
| 2016/0065990 A1* | 3/2016 | Shimizu | H04N 19/176 375/240.12 |
| 2018/0150995 A1* | 5/2018 | Kaneko | G06T 15/506 |
| 2018/0347978 A1* | 12/2018 | Sánchez | G01C 11/02 |
| 2019/0236796 A1* | 8/2019 | Blasco Claret | G06T 7/155 |

FOREIGN PATENT DOCUMENTS

| | | |
|---|---|---|
| DE | 102018209570 A1 | 12/2018 |
| JP | 02004179963 A * | 6/2004 |

OTHER PUBLICATIONS

Alcantarilla et al.: "Fast explicit diffusion for accelerated features in nonlinear scale spaces," In Proceedings of the British Machine Vision Conference. BMVA Press, 2013.
Baumberg: "Blending Images for Texturing 3D Models," BMVC (2002).
Bay et al.: "Speeded-Up Robust Features (surf)," Comput. Vis. Image Underst., 110 (3), 346-359 (2008).
Bolles: "Epipolar-Plane Image Analysis: An Approach to Determining Structure from Motion", International Journal of Computer Vision, 1, 7-55 (1987).
Cierniak: "X-ray computed tomography in biomedical engineering," Springer Science & Business Media (2011).
Duda et al.: "Use of the Hough Transformation to Detect Lines and Curves in Pictures," Comm. ACM, 15, 11-15 (1972).
Haro: "Shape from silhouette consensus and photo-consistency," 2014 IEEE International Conference on Image Processing (ICIP), Paris, 4837-4841 (2014).
Hartley et al.: "Multiple View Geometry in Computer Vision," Cambridge University Press, New York, NY, USA, 2nd ed. (2003).
Internet citation: "Random Sample Consensus," available at the url en.wikipedia.org/wiki/Random_sample_consensus (last accessed Mar. 3, 2020).
Isgro et al.: "Clustering for Surface Reconstruction," 1st International Workshop towards Semantic Virtual Environments, Villars, Switzerland: MIRALab., 156-162 (2005).
Jähne: "Digitale Bildverarbeitung," Springer Verlag, Berlin (1997). Relevance is found at least in paragraph [0103] of the instant specification.
Kazhdan et al.: "Poisson surface reconstruction," Proceedings of the fourth Eurographics symposium on Geometry processing (SGP '06), Eurographics Association, Aire-la-Ville, Switzerland, Switzerland, 61-70 (2006).
Kazhdan et al.: "Screened Poisson Surface Reconstruction," ACM Transactions on Graphics, 32. 61-70 (2006).
Lowe: "Object recognition from local scale invariant features; Proceedings of the International Conference on Computer Vision," ICCV '99, 1150-1157 (1999).
Matas et al.: "Robust Wide Baseline Stereo from Maximally Stable Extremal Regions," Proc. BMVC, 36.1-36.10 (2002).
Polisano et al. "Convex super-resolution detection of lines in images," Signal Processing Conference (EUSIPCO), 2016 24th European. IEEE, (2016).
Rong et al.: "An Improved Canny Edge Detection Algorithm," IEEE International Conference on Mechatronics and Automation, Tianjin, 577-582 (2014).
Sethian: "Level Set Methods and Fast Marching Methods Evolving Interfaces in Computational Geometry, Fluid Mechanics, Computer Vision, and Materials Science," Cambridge University Press (1999).
Sezgin et al.: "Survey over image thresholding techniques and quantitative performance evaluation," Journal of Electronic Imaging. 13 (1), 146-165 (2004).
Tao et al.: "Depth from Combining Defocus and Correspondence Using Light-Field Cameras," Proceedings of the 2013 IEEE International Conference on Computer Vision (ICCV '13). IEEE Computer Society, Washington, DC, USA, 673-680 (2013).
Wanner et al.: "Globally Consistent Depth Labeling of 4D Light Fields," Computer Vision and Pattern Recognition (CVPR), 2012 IEEE Conference on, IEEE (2012).
Yamazaki et al., "Coplanar Shadowgram Imaging for Acquiring Visual Hulls of Intricate Objects," International Journal of Computer Vision 81, 259-280 (2008).
Zhen et al.: "A Novel Stereo Vision Measurement System Using Both Line Scan Camera and Frame Camera," IEEE Transactions on Instrumentation and Measurement (vol. 68, Issue: 10, Oct. 2019), published Dec. 12, 2018.
Zhou et al.: "Parallel mean shift for interactive vol. segmentation," Machine learning in medical imaging, Lecture notes in Computer science, 67-75 (2010).
Extended European Search Report issued in EP18214974.0, to which this application claims priority, mailed May 19, 2019.
International Search Report issued in PCT/EP2019/086326, to which this application claims priority, mailed Feb. 13, 2020 and English-language translation thereof.
Written Opinion issued in PCT/EP2019/086326, to which this application claims priority, mailed Feb. 13, 2020.
International Preliminary Report on Patentability issued in PCT/EP2019/086326, to which this application claims priority, mailed Jul. 1, 2021, and English-language translation thereof.

* cited by examiner

METHOD AND APPARATUS FOR GENERATING A 3D RECONSTRUCTION OF AN OBJECT

CROSS REFERENCE TO RELATED APPLICATIONS

This application is a continuation-in-part application of international patent application PCT/EP2019/086326, filed Dec. 19, 2019, designating the United States and claiming priority from European patent application 18214974.0, filed Dec. 20, 2018, and the entire content of both applications is incorporated herein by reference.

TECHNICAL FIELD

The disclosure relates to a method for generating a 3D reconstruction of an object, including: illuminating the object, capturing image data in relation to the object, calculating the 3D reconstruction of the object from the image data, wherein the image data comprise first image data and second image data, and wherein the first image data are captured from different recording directions when the object is illuminated with illumination light, at least some of which, in relation to an object imaging beam path is reflected light which illuminates the object. The disclosure also relates to an apparatus for generating a 3D reconstruction of an object, comprising a device for illuminating the object with illumination light, comprising a device for capturing image data in relation to the object and comprising a device for calculating the 3D reconstruction of the object from the captured image data, wherein the captured image data include first image data and second image data, and wherein the first image data are captured from different recording directions when the object is illuminated with illumination light, at least some of which, in relation to an object imaging beam path, is reflected light which illuminates the object. Moreover, the disclosure relates to a computer program.

BACKGROUND

In the article "A Novel Stereo Vision Measurement System Using Both Line Scan Camera and Frame Camera," IEEE Transactions on Instrumentation and Measurement (Volume: 68, Issue: 10, October 2019, to Liu et al., a method and an apparatus of the type set forth at the outset have been described. The article suggests simultaneous capture of a greyscale value image of a surface and a depth image of a workpiece. When capturing the depth image, the workpiece is illuminated by laser light in a reflected light configuration and recorded from different recording positions by way of a single frame camera and by way of a line camera. From the image data captured thus, the 3D coordinates of the workpiece are calculated in a so-called stereo model by means of triangulation. To this end, an epipolar line $l_r$ is determined for a pixel $p_l$ recorded with the line camera on the basis of calibration information of the two cameras, on which epipolar line the 3D point P belonging to the pixel $p_l$ is located. Then, this epipolar line $l_r$ is projected into the recording of the single frame camera, wherein the pixel belonging to the 3D point P must lie on the projected epipolar line in the image plane of the single frame camera. The illumination of the workpiece with laser light then yields a narrow line, which is an image representation of a part of the workpiece, in the recording of the single frame camera. Subsequently, a pixel with a maximum greyscale value $p_r$ is determined by analysing the greyscale value profile along the projected epipolar line in the recording of the single frame camera. The coordinates of the 3D point P then emerge as a point of intersection of the epipolar line $l_r$ with the point $p_l$ and the epipolar line with the point $p_r$.

U.S. Pat. No. 9,357,204 B2 discloses the creation of the 3D reconstruction of a pair of spectacles by virtue of the pair of spectacles being disposed on a rotating rotary plate and being moved therewith in front of a plurality of image capturing devices, each of which being embodied as a camera. In the processes, images of the pair of spectacles are recorded in different perspectives, each showing a silhouette of the pair of spectacles. Then, a computer unit calculates a 3D reconstruction in relation to the pair of spectacles from these images.

DE 10 2018 209 570 A1, post-published and only forming state of the art pursuant to Article 54(3) EPC, specifies the ascertainment of a 3D reconstruction for an object by virtue of the object being displaced relative to an image capturing device and this being recorded in different positions of the object therewith. In that case, the captured images are projected onto a three-dimensional grid post filtering on the basis of an encoding function and a decoding function, the values of the grid representing the 3D reconstruction.

Commercially available 3D scanners, which provide a 3D reconstruction for an object by means of photogrammetry, are not suitable for the three-dimensional measurement of spectacles and spectacle frames since they have very thin and partly reflective structures. In order to be able to measure spectacles and spectacle lenses by means of a structured light projection, these parts must generally be provided with a surface coating, which is applied by means of a spray, for example. The accurate measurement of objects by laser line scanning requires the provision of high-power laser radiation and high-resolution cameras, which facilitate the capture of images with great brightness differences.

SUMMARY

It is an object of the disclosure to facilitate a more accurate 3D reconstruction of an object that may also have a section which is at least partly transparent to light, a section which at least partly reflects the light, or else a section which shines.

This object is achieved by the method and an apparatus for generating a 3D reconstruction of an object as disclosed herein. Exemplary embodiments of the disclosure are also discussed below.

The method according to the disclosure for generating a 3D reconstruction of an object comprises illuminating the object, capturing image data in relation to the object and calculating the 3D reconstruction of the object from the image data. Here, the image data comprise first image data and second image data, wherein the first image data are captured from different recording directions when the object is illuminated with illumination light, at least some of which, in relation to an object imaging beam path, is reflected light which illuminates the object, wherein the second image data are captured from different recording directions when the object is illuminated with illumination light, at least some of which, in relation to an object imaging beam path, is background light which illuminates the object, and the 3D reconstruction of the object is calculated from the first image data and the second image data.

Here, reflected light which illuminates the object is understood to mean a light which is incident on the object and which is scattered or reflected from an optically effective surface of the object, i.e., from a light-scattering or light-reflecting surface of the object, into a beam path, to the image plane, that images the object onto an image plane of an image capturing device.

Here, background light which illuminates the object is understood to mean light which is incident on the object and which, from a background of the object, reaches into a beam path which images the object onto an image plane of an image capturing device and, at least some of which, in the image plane, causes an image of a silhouette of the object, i.e., of an outline of the object. In relation to the object illuminating background light, the object in the image plane thus appears at least partly backlit.

The method according to the disclosure for generating a 3D reconstruction of an object can include, in particular, illuminating the object and capturing a multiplicity of images of the object with image data in the respective object imaging beam path, and calculating the 3D reconstruction of the object from the image data of the captured images. Here, the multiplicity of captured images of the object contain first images and second images with image data. The first images are captured from different recording directions when illuminating the object with illumination light, at least some of which, in relation to the respective object imaging beam path, is reflected light which illuminates the object. The second images are captured from different recording directions when illuminating the object with illumination light, at least some of which is guided in the respective object imaging beam path. Then, the 3D reconstruction of the object is calculated from the image data of the first and second images.

The method according to the disclosure for generating a 3D reconstruction of an object can also include illuminating the object and capturing a multiplicity of images of the object with image data by means of at least one image capturing device in an object imaging beam path in the case of different arrangements of the object relative to the at least one image capturing device, and calculating the 3D reconstruction of the object from the image data of the captured images, wherein the multiplicity of captured images of the object contain first images and second images with image data, wherein the first images are captured in relation to different arrangements of the object relative to at least one image capturing device when illuminating the object with illumination light, at least some of which, in relation to the object imaging beam path, is reflected light which illuminates the object, and wherein the second images are captured in relation to different arrangements of the object relative to the at least one image capturing device when the object is illuminated with illumination light, at least some of which is guided in the object imaging beam path to the at least one image capturing device. Then, the 3D reconstruction of the object is calculated from the image data of the first and second images.

An apparatus according to the disclosure for generating a 3D reconstruction of an object contains a device for illuminating the object with illumination light, a device for capturing image data in relation to the object and a device for calculating the 3D reconstruction of the object from the captured image data. The captured image data contain first image data and second image data, wherein the first image data are captured from different recording directions when the object is illuminated with illumination light, at least some of which, in relation to an object imaging beam path, is reflected light which illuminates the object, wherein the second image data are captured from different recording directions when the object is illuminated with illumination light, at least some of which is guided in an object imaging beam path, and the 3D reconstruction of the object is calculated from the first image data and the second image data.

An apparatus according to the disclosure for generating a 3D reconstruction of an object can include, in particular, a device for illuminating the object with illumination light and a device for capturing a multiplicity of images of the object with image data in the respective object imaging beam path, and a device for calculating the 3D reconstruction of the object from the captured images, wherein the multiplicity of captured images of the object contain first images and second images with image data, wherein the first images are captured from different recording directions when the object is illuminated with illumination light, at least some of which, in relation to the respective object imaging beam path, is reflected light which illuminates the object, wherein the second images are captured from different recording directions when the object is illuminated with illumination light, at least some of which is guided in the respective object imaging beam path, and wherein the 3D reconstruction of the object is calculated from the image data of the first and second images.

As an alternative thereto, an apparatus according to the disclosure for generating a 3D reconstruction of an object may also contain a device for illuminating the object with illumination light and a device for capturing a multiplicity of images of the object with image data in at least one image capturing device in an object imaging beam path in different arrangements of the object relative to the at least one image capturing device, wherein provision is made for a device for calculating the 3D reconstruction of the object from the captured images and wherein there is a device for illuminating the object with illumination light, at least some of which, in relation to the object imaging beam path, is reflected light which illuminates the object and which also facilitates the illumination of the object with illumination light, at least some of which is guided in the object imaging beam path to the at least one image capturing device. Here, the 3D reconstruction of the object is calculated from the image data of first and second images in a multiplicity of images captured by means of the device for capturing a multiplicity of images of the object with image data, wherein the first images are captured in relation to different arrangements of the object relative to the at least one image capturing device when the object is illuminated with illumination light, at least some of which, in relation to the object imaging beam path, is reflected light which illuminates the object, and wherein the second images are captured in relation to different arrangements of the object relative to the at least one image capturing device when the object is illuminated with illumination light, at least some of which is guided in the object imaging beam path to the at least one image capturing device.

The object for which the 3D reconstruction is generated can be a spectacle frame, in particular.

In the present case, an object imaging beam path of an image capturing device to an object is an optical beam path which wholly or partly images the object in an image plane of an image capturing device.

In the present case, reflected light illuminating an object in relation to the object imaging beam path should be understood to mean light which illuminates the object and, in the process, is scattered or reflected at a light scattering or reflecting surface of the object into an object imaging beam path which images the object.

By virtue of capturing images with image data in relation to different arrangements of the object relative to an image capturing device not only when illuminating the object with illumination light, at least some of which, in relation to the object imaging beam path, is reflected light which illuminates the object but also when illuminating the object with illumination light, at least some of which is guided in the object imaging beam path to the at least one image capturing device, it is possible to identify transparent structures of objects and take these into account in a 3D reconstruction of the object.

It is advantageous if a tomographic reconstruction of the object is ascertained for the calculation of the 3D reconstruction of the object. In this way, it is possible, in particular, to specify an accurate 3D reconstruction for thin objects.

In the present case, the tomographic 3D reconstruction of an object should be understood to mean a method for generating a three-dimensional image representation of an object as described in the German patent application DE 10 2018 209 570.1, to which reference is hereby made and the disclosure of which is incorporated in the entirety thereof in the present description of the disclosure. This method represents the three-dimensional image representation of the object, i.e., the tomographic 3D reconstruction of the object, as a 3D voxel grid, which are calculated from, e.g., captured intensity images that are available for the object.

In principle, intensity images can also be colored images. The aforementioned calculation can therefore be carried out individually on each color channel, both for the first images which are captured in relation to different arrangements of the object relative to the at least one image capturing device when illuminating the object with illumination light and for the second images, which are captured in relation to different arrangements of the object relative to the at least one image capturing device when the object is illuminated with illumination light, at least some of which is guided in the object imaging beam path to the at least one image capturing device.

The method of tomographic 3D reconstruction contains the following steps:

The intensity images in relation to the object are pre-processed, e.g., as described in the publication R. Cierniak, "X-ray computed tomography in biomedical engineering," Springer Science & Business Media (2011), to which reference is hereby made and the disclosure of which is incorporated in the entirety thereof in the present description of the disclosure, by means of a high pass filter, a Ram-Lak filter, a Shepp-Logan filter, a generalized Hamming filter, a low pass cosine filter, by calculating object feature images or by highlighting the edges in the image by means of an additional filter step so that only the outside edges of the object are visible in the 3D reconstruction thereof.

A 3D voxel grid is constructed from the pre-processed images, the resolution of the 3D voxel grid depending on the required reconstruction accuracy.

i) In the present case, a voxel should be understood to mean a grid point in a three-dimensional grid. A 3D voxel grid represents a 3D object in a computer unit. By way of example, if a voxel is located within an object or on a surface of an object, it is assigned a value greater than 0 and less than or equal to 1. If a voxel is located outside of an object, it is assigned a value of 0. In the case of half-transparent objects, the value of the voxel specifies the degree of transparency of the object at this point. In the case of opaque objects, values of 0 are assumed outside of the object and values of 1 are assumed within the object.

An intensity in the grid is calculated for each voxel by means of a coding and decoding function. The following steps are applied in the process:
a. projecting the voxel centre in each pre-processed captured image by means of the imaging parameters of the associated image capturing devices;
b. reading the intensity of the pixel;
c. weighting the intensity with a weight factor that is inversely proportional to the distance of the voxel from the associated image capturing device (coding function); and
d. calculating the sum of the weighted intensities over all captured images (decoding function).

This yields a 3D voxel grid with a three-dimensional intensity distribution, the maxima of which correspond to the 3D object points.

It is advantageous if the 3D voxel grid is corrected for artefacts by means of a filter and/or a neural network. This can increase the accuracy of the 3D reconstruction of the object, the 3D reconstruction of the object precisely reproducing the object even in the case of different complicated object geometries. It is also advantageous if the calculation of the 3D reconstruction of the object comprises a calculation of object feature images for at least some of the first images. This allows the 3D reconstruction to be restricted to the filtered features and, as a result, it is possible to achieve a reduction in the computation time and in the data to be processed when calculating the 3D reconstruction of the object.

By way of example, each pixel in an object feature image may contain the information whether a certain feature of the object is present in this pixel. In particular, detected features can be edges, corners, so-called blobs or else important pixels, i.e., "points of interest." In particular, object feature images can be binary images with image pixels, which assume either a value of $W=0$ or a value of $W=1$. A value of $W=1$ means that the sought-after feature, e.g., an edge, is present in this pixel. A value of $W=0$ states that this is not the case. Alternatively, object feature images may also contain values in the interval [0, 1], which represent a probability for the presence of the sought-after feature. Other values are also possible, e.g., vectors with filter responses when convolving the captured images with one or more filter kernels for detecting specific features, e.g., a Gabor filter for texture analysis, SIFT features for detecting important pixels, as described in the publication D. G. Lowe, "Object recognition from local scale invariant features; Proceedings of the International Conference on Computer Vision," ICCV '99, 1150-1157 (1999), to which reference is hereby made and the disclosure of which is incorporated in the entirety thereof in the present description of the disclosure.

It is also possible to use a SURF feature detector, as described in the publication H. Bay, A. Ess, T. Tuytelaars, and L. Van Gool, "Speeded-Up Robust Features (surf)," Comput. Vis. Image Underst., 110 (3), 346-359 (2008), to which reference is hereby made and the disclosure of which is incorporated in the entirety thereof in the present description of the disclosure, or an AKAZE feature detector, as described in the publication A. B. Pablo Alcantarilla, J. Nuevo: "Fast explicit diffusion for accelerated features in nonlinear scale spaces"; In Proceedings of the British Machine Vision Conference. BMVA Press, 2013, to which reference is hereby made and the disclosure of which is incorporated in the entirety thereof in the present description of the disclosure, or an MSER feature detector, as is known from the publication Matas, O. Chum, M. Urban, T. Pajdla, "Robust Wide Baseline Stereo from Maximally Stable Extremal Regions," Proc. BMVC, 36.1-36.10 (2002). To this publication, too, reference is hereby made and the disclosure thereof is incorporated in the entirety thereof in the present description of the disclosure. Moreover, a plurality of the above-described detectors could be combined. In particular, it is possible to use filters learned by means of machine learning for application-specific tasks such as the detection of frame edges of a spectacle frame, for example.

Since the features of an object often cannot be localized precisely on one pixel, every detected feature can be weighted locally by means of a Gaussian function. It should be noted that the object feature images may have, e.g., a single object feature or else a plurality of object features from the group of edges, corners and Gabor features as a feature.

Calculating the object feature images by means of machine learning or by means of a neural network means that it is not necessary for features to be set in advance in a device for calculating the 3D reconstruction of the object from the captured images. Then, an algorithm in the device itself can learn the features of the object and how these should be detected. This can likewise increase the accuracy of the 3D reconstruction calculated for an object.

For the purposes of calculating the 3D reconstruction of the object, provision can be made, in particular, for segmented image masks to be determined and for the cutting of an object part from at least a part of the first and/or second images by means of segmented image masks to be provided for.

In the present case, a segmented image mask should be understood to mean an image that is an image representation of the object in the form of a binary image, in which precisely the pixels belonging to the image representation of the object to be reconstructed have a value of 1 and in which the pixels of the background have a value of 0.

In particular, segmented image masks can be determined by means of machine learning by virtue of the images to be segmented initially being segmented manually by placement of contour points and subsequently a neural network being trained for the identification of the image masks. As an alternative or in addition thereto, simulated image data can be generated for known 3D objects and the segmented image masks thereof, and these can be used as training data for the neural network. Here, it is advantageous to use both first and second captured images as an input for the neural network since the calculation of the segmented image masks on the basis of both image data is more accurate.

Calculating the 3D reconstruction of the object may also comprise a calculation of edge information images from the first and/or second images.

Edge information images should be understood to mean available object feature images for the specific "edge" feature. In principle, different filters can be used for detecting edges, for example Canny edge detectors as described in the publication W. Rong, Z. Li, W. Zhang and L. Sun, "An Improved Canny Edge Detection Algorithm," IEEE International Conference on Mechatronics and Automation, Tianjin, 577-582 (2014), to which reference is hereby made and the disclosure of which is incorporated in the entirety thereof in the present description of the disclosure, or as described in US 2015/0362761 A, to which reference is likewise hereby made and the disclosure of which is incorporated in the entirety thereof in the present description of the disclosure, or else as described in the publication R. C. Bolles, H. H. Baker, D. H. Marimont, "Epipolar-Plane Image Analysis: An Approach to Determining Structure from Motion," International Journal of Computer Vision, 1, 7-55 (1987), to which reference is equally hereby made and the disclosure of which is incorporated in the entirety thereof in the present description of the disclosure, or Hough transforms as described in the publication R. O. Duda, P. E. Hart, "Use f the Transformation to Detect Lines and Curves in Pictures." Comm. ACM, 15, 11-15 (1972), to which reference is likewise hereby made and the disclosure of which is incorporated in the entirety thereof in the present description of the disclosure, or else structure tensors, as described in the publication S. Wanner, B. Goldlucke, "Globally Consistent Depth Labeling of 4D Light Fields," Computer Vision and Pattern Recognition (CVPR), 2012 IEEE Conference on, IEEE (2012), to which reference is likewise hereby made and the disclosure of which is incorporated in the entirety thereof in the present description of the disclosure. It should be noted that edge detection filters learned by means of so-called machine learning can also be used for detecting specially trained edges.

In particular, calculating the 3D reconstruction of the object can be implemented on the basis of calculating epipolar plane images from the object feature images and/or the edge information images.

Figure 1:
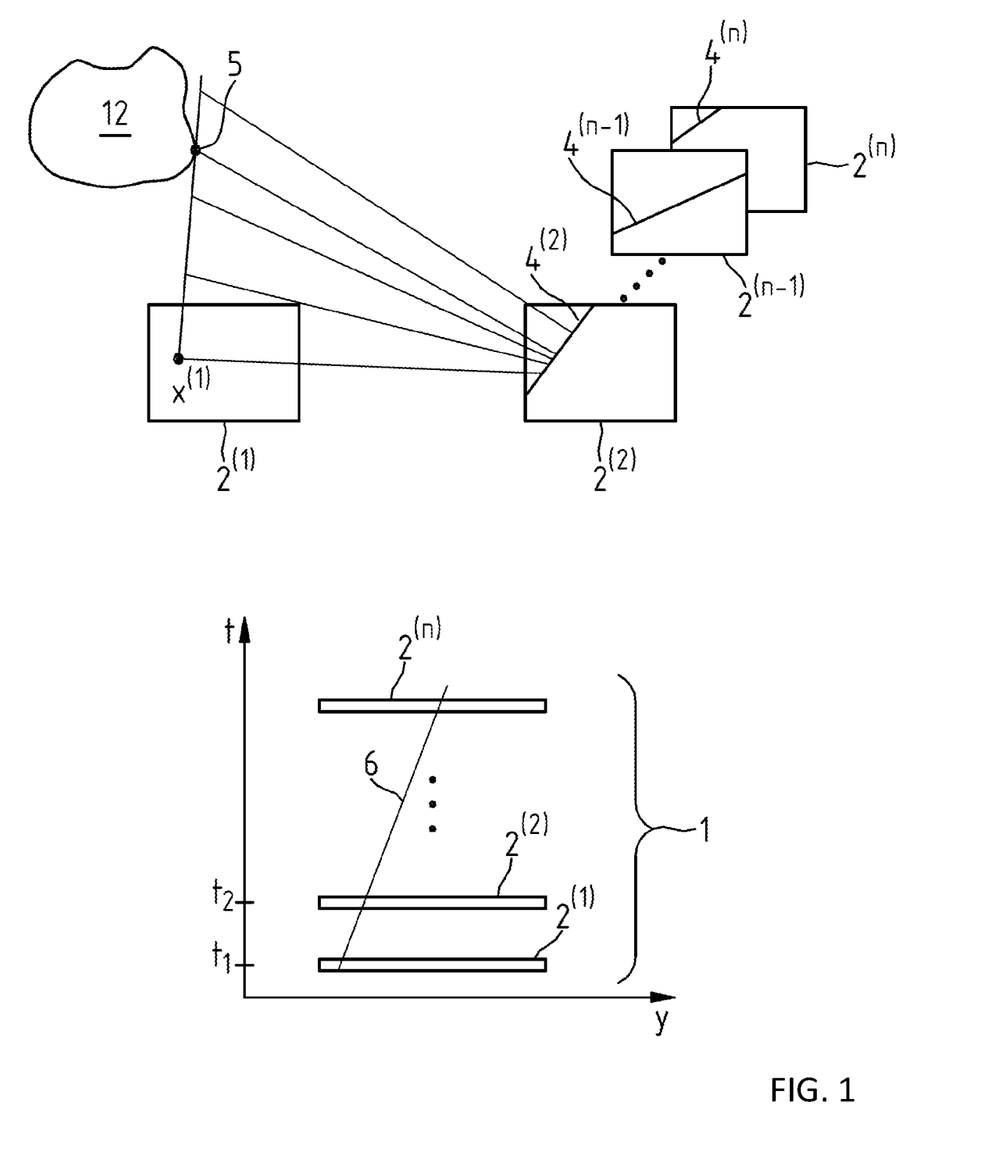
FIG. 1 shows the calculation of an epipolar plane image from captured images by exploiting epipolar-geometric relationships.

FIG. 1 is an illustration of the calculation of an epipolar plane image from captured images by exploiting epipolar-geometric relationships.

The so-called epipolar geometry finds use when calculating depth maps and the 3D reconstruction of objects. With reference to FIG. 1, the 3D point 5 of the object 12 is mapped to a certain pixel $x^{(1)}$ of the image plane of the image capturing device in each arrangement of the object relative to the image capturing device. Conversely, if a selected pixel $x^{(1)}$ is considered in a recorded image, then an entire line in the 3D space of all 3D points with a different depth corresponds to this pixel, the 3D points being mapped onto this one pixel. This line can be calculated from the selected pixel and the known imaging parameters of the image capturing device. In a second recorded image relating to a different arrangement of the object relative to the image capturing device, this 3D line is projected onto a 2D line $4^{(2)}$. This is the so-called epipolar line. The image representation of the selected 3D object point must also be located thereon. This greatly restricts the search area and thus the problem of detecting corresponding points in different captured images is simplified by calculating the epipolar line $4^{(2)}$. Detecting corresponding points in two images relating to different arrangements of the object which are captured by means of the image capturing device allows the depth of the associated 3D point 5 to be deduced by triangulation with the aid of the imaging parameters of the image capturing device. In order to simplify the calculation of the epipolar lines $4^{(2)}, \ldots 4^{(n)}$, it is possible to apply methods such as, e.g., a rectification of the image pairs relative to a certain image in the captured images or an image rotation, as described in the publication R. Hartley and A. Zisserman, "Multiple View Geometry in Computer Vision," Cambridge University Press, New York, NY, USA, 2nd ed. (2003), to which reference is hereby made and the disclosure of which is incorporated in the entirety thereof in the present description of the disclosure.

With reference to FIG. 1, epipolar plane images $E_{x,k}(y,t)$ are understood to mean images 1 constructed from pixels y, which are calculated on the basis of the epipolar geometry from a plurality of images $2^{(1)}, 2^{(2)}, \ldots, 2^{(n-1)}, 2^{(n)}$, captured in relation to an object 12 at different times t by means of an image capturing device k, in different, known arrangements of the images relative to the image capturing device k and with known imaging properties of the image capturing device k taken into account.

For each selected pixel $x^{(1)}$ ... in a first captured image $2^{(1)}$, the so-called epipolar line $4^{(2)}, \ldots, 4^{(n)}$ is specified in each further captured image $2^{(2)}, \ldots, 2^{(n)}$ to this end. Thus, for various arrangements of the object in front of the image capturing device, an epipolar plane image $E_{x,k}(y,t)$ contains the associated epipolar lines $4^{(2)}, \ldots 4^{(n)}$ in corresponding further captured images $2^{(2)}, \ldots, 2^{(n-1)}, 2^{(n)}$ for the selected pixel $x^{(1)}$ in the captured first image $2^{(1)}$. Consequently, in each image line with pixels y, an epipolar plane image $E_{x,k}(y,t)$ contains the intensities of an epipolar line $4^{(2)}, \ldots 4^{(n)}$ in relation to the selected pixel x in the respective image of the image capturing device k captured at the time t.

If the object 12 and the image capturing device k move along a straight line trajectory relative to one another when capturing the images $2^{(1)}, 2^{(2)}, \ldots, 2^{(n-1)}, 2^{(n)}$, the epipolar plane image $E_{x,k}(y,t)$ correspondingly contains an object point trajectory in the form of a straight line 6, which describes the movement of the 3D point 5 of the object 12 that belongs to the selected pixel. It should be noted that distorting the images captured by means of the image capturing device suffices so as to be able to obtain a straight line in the epipolar plane image.

Then, the spatial depth of the 3D point 5 relative to the image capturing device is determined from the gradient of this straight line 6, which corresponds to the depth-dependent offset, the so-called "disparity" in stereo depth estimation methods.

In principle, detecting the object point trajectory in the form of the straight line 6 and determining the gradient thereof can be implemented using various image processing methods. By way of example, the object pointer trajectory can be detected and the gradient thereof can be determined on the basis of a Hough transform, in a structure tensor calculation, by means of convex super-resolution as described in K. Polisano et al. "Convex super-resolution detection of lines in images," Signal Processing Conference (EUSIPCO), 2016 24th European. IEEE, (2016), to which reference is hereby made and the disclosure of which is incorporated in the entirety thereof in the present description of the disclosure or, as specified in the publication M. W. Tao, S. Hadap, J. Malik, and R. Ramamoorthi, "Depth from Combining Defocus and Correspondence Using Light-Field Cameras," Proceedings of the 2013 IEEE International Conference on Computer Vision (ICCV '13). IEEE Computer Society, Washington, DC, USA, 673-680 (2013), to which reference is likewise hereby made and the disclosure of which is incorporated in the entirety thereof in the present description of the disclosure, by means of symmetry-based calculation methods such as a depth-from-defocus calculation, for example.

According to the disclosure, an epipolar-geometric 3D reconstruction of an object can be carried out as follows:

In a first step, the image capturing devices in the apparatus for generating a 3D reconstruction of an object are calibrated by virtue of the intrinsic and extrinsic imaging parameters thereof being determined and the spatial position of each image capturing device been ascertained relative to the respective other image capturing devices. Then, the device for moving the object relative to the image capturing devices is calibrated in a further step. As a result of this calibration procedure, a rotation matrix and a translation vector are obtained for each arrangement of the object relative to the image capturing devices.

The extrinsic imaging parameters of an image capturing device describe properties such as the relative alignment of the optical axis of the image capturing device in relation to another image capturing device or a predetermined coordinate system. The intrinsic imaging parameters define how the coordinates of a point, which is imaged in the image plane of the image sensor of the image capturing device, in a coordinate system referenced to the corresponding image capturing device are converted into the coordinates of the pixel of this point located in the image plane of the image sensor.

A comprehensive explanation of the calibration of image capturing devices in the form of cameras can be found, for example, on page 8 in the textbook "Multiple View Geometry in Computer Vision," by R. Hartley and A. Zisserman, 2nd edition, Cambridge University Press (2004), to which reference is hereby made and the disclosure of which is incorporated in the entirety thereof in the present description of the disclosure.

Then, edges and features in the image data of the captured images are detected for the epipolar-geometric 3D reconstruction of the object.

Thereupon, epipolar plane images are calculated for each detected feature.

Then, object point trajectories are detected in the epipolar plane images and the gradient of the object point trajectories is calculated.

Then, the associated depth is determined with the imaging parameters of the image capturing device being used.

As a result, a 3D point of a point cloud emerges for each feature point, the point cloud representing the 3D reconstruction of the object.

It should be noted that the simultaneous use of a plurality of image capturing devices and the use of methods for error minimization, for instance averaging or robust estimators such as the so-called "random sample consensus" (RANSAC) method, which is described, e.g., at the url en.wikipedia.org/wiki/Random_sample_consensus (as of 16 Nov. 2017), allow a more robust 3D reconstruction to be calculated, the reference being referred herewith and the disclosure thereof being incorporated in the entirety thereof in the present description of the disclosure.

It is advantageous if the calculation of the 3D reconstruction of the object implements the calculation of object point trajectories from the epipolar plane images and the measurement of the gradient of the calculated object point trajectories and the estimation of depth information by means of triangulation to form an epipolar geometric 3D reconstruction of the object. As a result of this, it is no longer necessary to carry out a depth calculation by comparing image sections, which allows a reconstruction of very thin structures.

Calculating object point trajectories also brings about a robustness to the 3D reconstruction of the object if the object has structures that are transparent to light since changes in the color of an individual object point, either gradually or over a few images, have little or no effect in this case. This is because object point trajectories are calculated as lines over all images.

In particular, provision can be made for a tomographic reconstruction of the object to be ascertained for the purposes of calculating the 3D reconstruction of the object by virtue of the image data of the first and second images being back-projected into a 3D voxel grid following a spatially dependent weighting and possible filtering, wherein the epipolar geometric 3D reconstruction of the object is combined by calculation with the 3D voxel grid to form the 3D reconstruction of the object.

As a result of this, the 3D reconstruction of the object can be reliable and accurate, even for different object geometries, since errors in the epipolar-geometric 3D reconstruction of the object and in the tomographic 3D reconstruction of the object disappear by averaging in this case.

The accuracy of the 3D reconstruction of the object can be increased further by virtue of the 3D voxel grid being corrected for artefacts by means of a filter and/or a neural network.

Typically, a mesh for describing the surface of the object is calculated from the 3D voxel grid. This allows faster processing of the 3D data in comparison with a point cloud. It should be noted that the mesh can be extracted from the 3D voxel grid by means of the mean-shift method or by means of the marching-cubes method, for example as described in the publication F. Isgro, F. Odone, W. Saleem and & O. Schal, "Clustering for Surface Reconstruction," 1st International Workshop towards Semantic Virtual Environments, Villars, Switzerland: MIRALab., 156-162 (2005), which is referred herewith and the disclosure of which is incorporated in the entirety thereof in the present description of the disclosure, or as described in the publication F. Zhou, Y. Zhao, K. Liu Ma, "Parallel mean shift for interactive volume segmentation," Machine learning in medical imaging, Lecture notes in Computer science, 67-75 (2010), which is likewise referred herewith and the disclosure of which is incorporated in the entirety thereof in the present description of the disclosure, or by means of a Poisson reconstruction method, as described in the publication M. Kazhdan, M. Bolitho, H. Hoppe, "Poisson surface reconstruction," Proceedings of the fourth Eurographics symposium on Geometry processing (SGP '06), Eurographics Association, Aire-la-Ville, Switzerland, Switzerland, 61-70 (2006), which is referred herewith and the disclosure of which is incorporated in the entirety thereof in the present description of the disclosure, or in the publication M. Kazhdan, Michael & Bolitho, Matthew & Hoppe, Hugues, "Screened Poisson Surface Reconstruction," ACM Transactions on Graphics, 32. 61-70 (2006), which also is referred herewith and the disclosure of which is incorporated in the entirety thereof in the present description of the disclosure.

In the present case, a point cloud is understood to mean a set of points in a vector space, which has an unorganized spatial structure. The points represent points on the surface of the 3D object. The point cloud is usually an intermediate step in calculating a 3D model with mesh and texture.

It should also be noted that the mesh can have nodes with texture coordinates, wherein the texture coordinates refer into a texture image with texture information which is calculated by virtue of the captured first images being projected and superposed on the 3D reconstruction with use being made of the intrinsic and extrinsic imaging parameters of the image capturing devices, as described on page 5 of the publication A. Baumberg, "Blending Images for Texturing 3D Models," BMVC (2002), to which reference is hereby made and the disclosure of which is incorporated in the entirety thereof in the present description of the disclosure.

In the present case, a texture image should be understood to mean an image that describes properties of the appearance of the surface points of a 3D reconstruction of an object, in particular the color and the reflection properties. Textures may consist of color values, e.g., 2D images. However, reflection properties of the object may additionally also be stored in a texture. The so-called "texture mapping" is a mapping which assigns each 3D point on the surface of the object or on the mesh one or more texture coordinates. The texture coordinates determine the assignment of the texture points to the 3D points of the object surface.

The intensity profile along the object point trajectories can be analyzed to estimate the reflection properties of the reconstructed object. In the case of purely diffusely reflecting surface points, this intensity profile over the various object arrangements relative to the image capturing device is largely constant. The intensity increasingly deviates from the constant profile with an increasing specular component. A specular texture image can be generated from this information in a manner analogous to the diffuse texture image, i.e., the pure color information.

By way of example, the texture image can be calculated by projecting the first images onto the mesh. Alternatively, the color or intensity value from the multi-channel 3D voxel grid can be transferred onto the mesh, e.g., as a mean value of the direct voxel neighborhood of the respective mesh node. Mesh normals can be calculated from the 3D voxel grid by way of derivative filters.

The 3D reconstruction of the object contains the information about the calculated texture transparency by virtue of a texture transparency being calculated from the second images.

The texture transparency describes the light transmissivity of a surface of a 3D object. This is stored in the so-called alpha channel of a texture, in addition to the color information. The alpha channel usually adopts values in the interval [0, 1]. A value of 1 means that the texture is opaque at this point; by contrast, a value of 0 means that the texture is invisible. For intermediate values in the range of [0, 1], the texture is linearly interpolated with textures lying therebehind. For determining the texture transparency, the so-called alpha channel of the texture can be estimated from the captured second images by virtue of the nodes of the mesh being projected into the individual captured second images. The texture becomes more transparent and the alpha value reduces, the brighter the imaged point is in the captured images.

By calculating the texture transparency, it is possible for the transparency of the texture to be determined from the second images in relation to different arrangements of the object relative to the at least one image capturing device when the object is illuminated with illumination light, at least some of which is guided in the object imaging beam path to the at least one image capturing device.

In particular, a specular texture image can be calculated from the first and/or second images, wherein the 3D reconstruction of the object contains information of the calculated texture image.

A high accuracy of the calculated 3D reconstruction of the object can be achieved by virtue of the captured images being color images because the information of, e.g., 3 color channels, and not only the information from a single greyscale value channel, can be evaluated in this way.

It is particularly advantageous to determine the 3D reconstruction of the object by combining by calculation a plurality of 3D color channel reconstructions of the object, in particular by way of averaging or robust estimators, for instance within the scope of a RANSAC method, wherein each 3D color channel reconstruction then is calculated from the image data of the first and second images for a color channel and/or for a texture transparency channel. This allows the accuracy of the calculated 3D reconstruction of the object to be further increased, even in the case of different object geometries. A calculated 3D reconstruction of the object may have texture information.

What can be achieved by reflecting a view of the object into the image capturing device is that an image capturing device can capture the object from different sides and can thus also record structures that may be covered.

It is advantageous if the calculation of the 3D reconstruction of the object comprises the calculation of a visual shell from silhouettes of the object calculated from the image data of the second images, as described in the publication Y. Shuntaro et al., "The Theory and Practice of Coplanar Shadowgram Imaging for Acquiring Visual Hulls of Intricate Objects," International Journal of Computer Vision 81, 259-280 (2008), to which reference is hereby made and the disclosure of which is incorporated in the entirety thereof in the present description of the disclosure, or in the publication G. Haro, "Shape from silhouette consensus and photoconsistency," 2014 IEEE International Conference on Image Processing (ICIP), Paris, 4837-4841 (2014), to which reference is also hereby made and the disclosure of which is incorporated in the entirety thereof in the present description of the disclosure.

In the present case, the silhouette of an object should be understood to mean a binary image as a result of a perspective projection of the object onto the image plane of an image capturing device, with precisely those points in the image plane on which at least one object point is imaged belonging to the silhouette.

Calculating the visual shell from silhouettes of the object calculated from the second image data or from the image data of the second images brings about a further increase in accuracy of the calculated 3D reconstruction of the object because a visual shell of the object specifies a good approximation of the object. When calculating the 3D reconstruction of the object, it is possible, in particular, to take account of the distance of a calculated 3D voxel from the visual shell.

The disclosure also extends to the visualization of a 3D reconstruction of an object generated using an above-mentioned method, in particular a spectacle lens, with a mesh on a display area of an image display device, in particular a display. Moreover, the disclosure also extends to a computer program with program code for carrying out the method specified above, in particular by means of an apparatus, as specified above, for generating a 3D reconstruction of an object.

Advantageous exemplary embodiments of the disclosure are schematically depicted in FIG. 2 to FIG. 5 and described below.

BRIEF DESCRIPTION OF THE DRAWINGS

The disclosure will now be described with reference to the drawings wherein.

DESCRIPTION OF EXEMPLARY EMBODIMENTS

Figure 2:
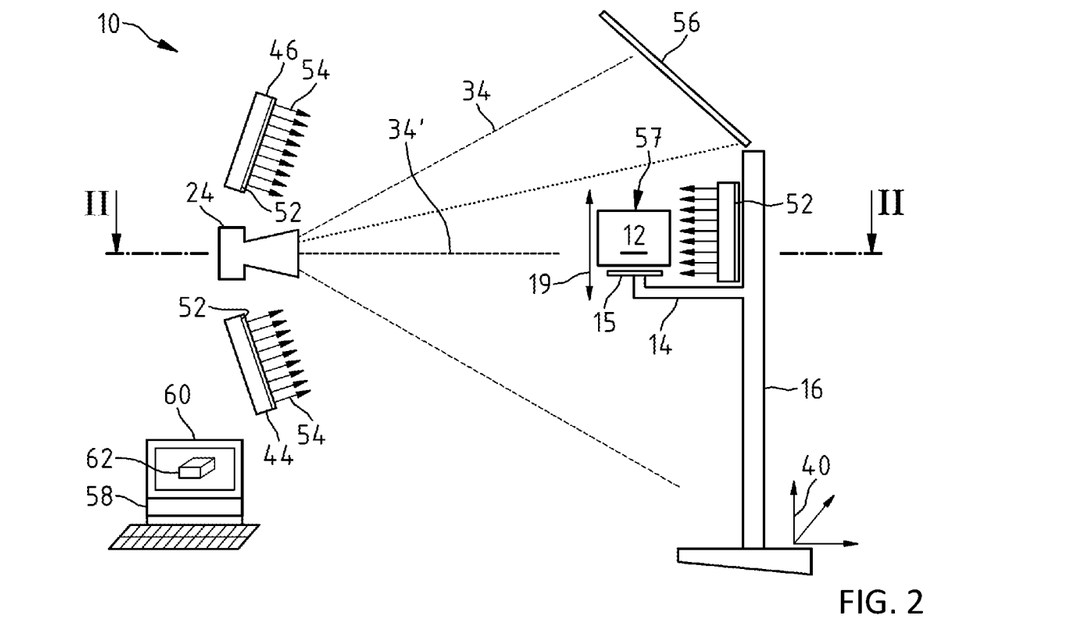
FIG. 2 shows a side view of an apparatus for generating a 3D reconstruction of an object.
Figure 3:
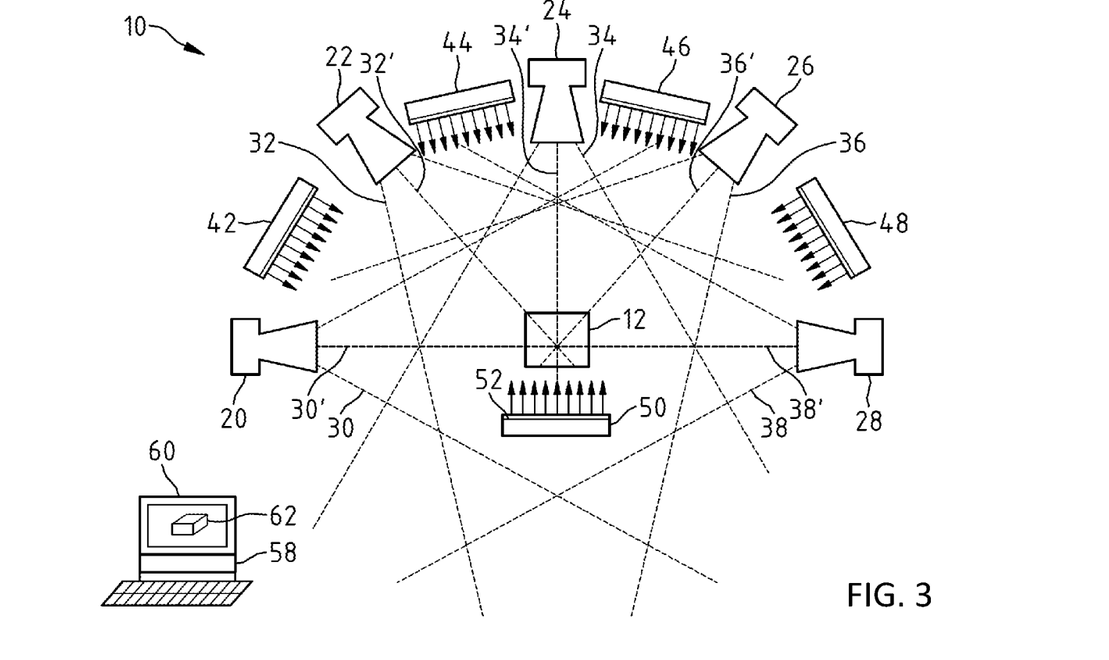
FIG. 3 shows a plan view of the apparatus for generating a 3D reconstruction of an object.

The apparatus 10 shown in FIG. 2 is used to generate a 3D reconstruction of an object 12. By way of example, the object 12 can be a spectacle frame. In the apparatus 10, there is a device for moving the object 12 using an object carrier 15 in the form of an elevating table, which is received in a holding arm 14. The holding arm 14 of the object carrier 15 is connected to a column 16 extending in a longitudinal direction. FIG. 3 shows a plan view of the apparatus 10 from FIG. 2 on the plane 18 identified therein by arrows II-II.

The holding arm 14 of the object carrier 15 can be displaced in motor-driven fashion on the column 16 in a manner parallel to the longitudinal direction of the column 16 along the direction of the double-headed arrow 19.

The apparatus 10 contains a first image capturing device 20, a second image capturing device 22, a third image capturing device 24, a fourth image capturing device 26 and a fifth image capturing device 28. In the present case, the image capturing devices 20, 22, 24, 26, and 28 are embodied as cameras, which each comprise an objective lens system and contain a planar image sensor in the form of a CCD chip. The image capturing devices 20, 22, 24, 26, and 28 each allow images of the object 12 disposed on the object carrier 15 to be recorded by way of an object imaging beam path 30, 32, 34, 36, and 38 from different recording directions 30', 32', 34', 36', and 38' in relation to a coordinate system 40 that is stationary with respect to the column 16. Using this, a multiplicity of images of the object 12 with image data relating to different arrangements of the object 12 relative to the image capturing devices 20, 22, 24, 26, and 28 can be captured in relation to the object 12 in the apparatus 10. There is a mirror 56 in the apparatus 10 for steering the object imaging beam path 34 of the image capturing device 24 to a side 57 of the object 12 that faces away from the image capturing device 24.

The image capturing devices 20, 22, 24, 26, and 28 are designed for the capture of monochrome images, in particular images in black and white. However, it should be noted that an alternative exemplary embodiment of the apparatus 10 can also have image capturing devices 20, 22, 24, 26, and 28 that are designed for the capture of color images.

The apparatus 10 contains a plurality of light sources 42, 44, 46, 48, and 50 as a device for illuminating the object 12 with illumination light. The light sources 42, 44, 46, 48, and 50 each have an areal illuminant 52, which is used to provide diffuse illumination light 54. In the apparatus 10, the light source 42 facilitates illuminating the object 12 with diffuse light, at least some of which, in relation to the object imaging beam path 30, 32, 34, and 36, is reflected light which illuminates the object 12.

In the apparatus 10, the light source 44 provides illumination light 54, at least some of which, in relation to the object imaging beam path 30, 32, 34, and 36, is reflected light which illuminates the object 12. That is to say, the light incident on the object 12 from the light source 44 is at least partly reflected or scattered into the optical imaging beam path 30, 32, 34, and 36 from an optically effective surface of the object 12 and thus reaches an image plane of the respective image sensor of the image capturing devices 20, 22, 24, and 26. In the apparatus 10, the light source 46 can also provide illumination light, at least some of which, in relation to the object imaging beam path 32, 34, 36, and 38, is reflected light which illuminates the object 12. In the apparatus 10, the light source 48 likewise generates illumination light, at least some of which, in relation to the object imaging beam path 32, 34, 36, and 38, is reflected light which illuminates the object 12.

Here, background light which illuminates the object is understood to mean light which is incident on the object and which, from a background of the object, reaches into a beam path which images the object onto an image plane of an image capturing device and which, in the image plane, causes an image of a silhouette of the object, i.e., of an outline of the object.

The light source 50 facilitates the provision of illumination light 54, at least some of which guided onto an image plane of the image sensor of the image capturing device 24 in the object imaging beam path 34 to the third image capturing device 24, which illumination light originates from the background of the object 12 in relation to the arrangement of the image capturing device 24 with respect to the object 12. The light originating from the background of the object 12, which light reaches an image plane of the image sensor of the image capturing device 24, is neither scattered nor reflected at the object 12 as a matter of principle and generates an image of a silhouette of the object 12, i.e., of an outline of the object 12, in the image plane of the image sensor of the image capturing device 24. As a result, in relation to the light source 50 in the image plane of the image capturing device 24, the object 12 appears backlit.

The apparatus 10 comprises a computer unit 58 and has a display 60 for visualizing a 3D reconstruction 62 of the object 12. The computer unit 58 is connected to the image capturing devices 20, 22, 24, 26, and 28. It is used, firstly, for controlling the image capturing devices 20, 22, 24, 26, and 28 and the light sources 42, 44, 46, 48, and 50 and the device for moving the object 12. Secondly, the computer unit 58 is used to capture and process image data of images, recorded in the apparatus 10 in the case of different arrangements of the object 12 in the apparatus 10 and supplied by the image capturing devices 20, 22, 24, 26, and 28, by means of a computer program by virtue of the object 12 being captured, typically simultaneously, by means of the image capturing devices 20, 22, 24, 26, and 28 and being disposed in different positions by displacing the holding arms 14 in the coordinate system 40 that is stationary with respect to the column 16. This measure causes the object 12 to be captured from different recording directions by means of the image capturing devices.

The computer program in the computer unit 58 calculates a 3D reconstruction 62 of the object 12, displayed on the display 60, from the image data of the images in relation to the object 12 that were recorded by means of the image capturing devices 20, 22, 24, 26, and 28.

It should be noted that, in an alternative, modified exemplary embodiment of the apparatus 10, provision can be made for the image capturing devices 20, 22, 24, 26, and 28 to be displaceable and for the holding arm 14 with the object carrier 15 to be stationary in the coordinate system 40 that is stationary with respect to the column 16 in order to facilitate the capture of a multiplicity of images of the object with image data in the case of different arrangements of the object 12 relative to the image capturing devices 20, 22, 24, 26, and 28 and the light source 50.

An alternative structure to the structure of the apparatus 10 described above provides for both the object carrier 15 and the image capturing devices 20, 22, 24, 26, and 28 of the apparatus 10 to be displaced for the purposes of capturing a multiplicity of images of the object with image data in the case of different arrangements of the object 12 relative to the image capturing devices 20, 22, 24, 26, and 28. It should be noted that, alternatively or additionally, provision can also be made for the object carrier 15 to be rotated about a vertical axis relative to the image capturing devices 20, 22, 24, 26, and 28 in the coordinate system 40 that is stationary with respect to the column 16. However, the image capturing devices 20, 22, 24, 26, and 28 could also be disposed in rotational fashion so that these can carry out a rotational movement about an object 12 disposed on the object carrier 15.

The intrinsic and extrinsic imaging parameters of the image capturing devices 20, 22, 24, 26, and 28 are calibrated in the apparatus 10 in such a way that the spatial position of the object carrier 15 is known relative to the image capturing devices in the coordinate system 40 when a single image of the object 12 is captured.

Figure 4:
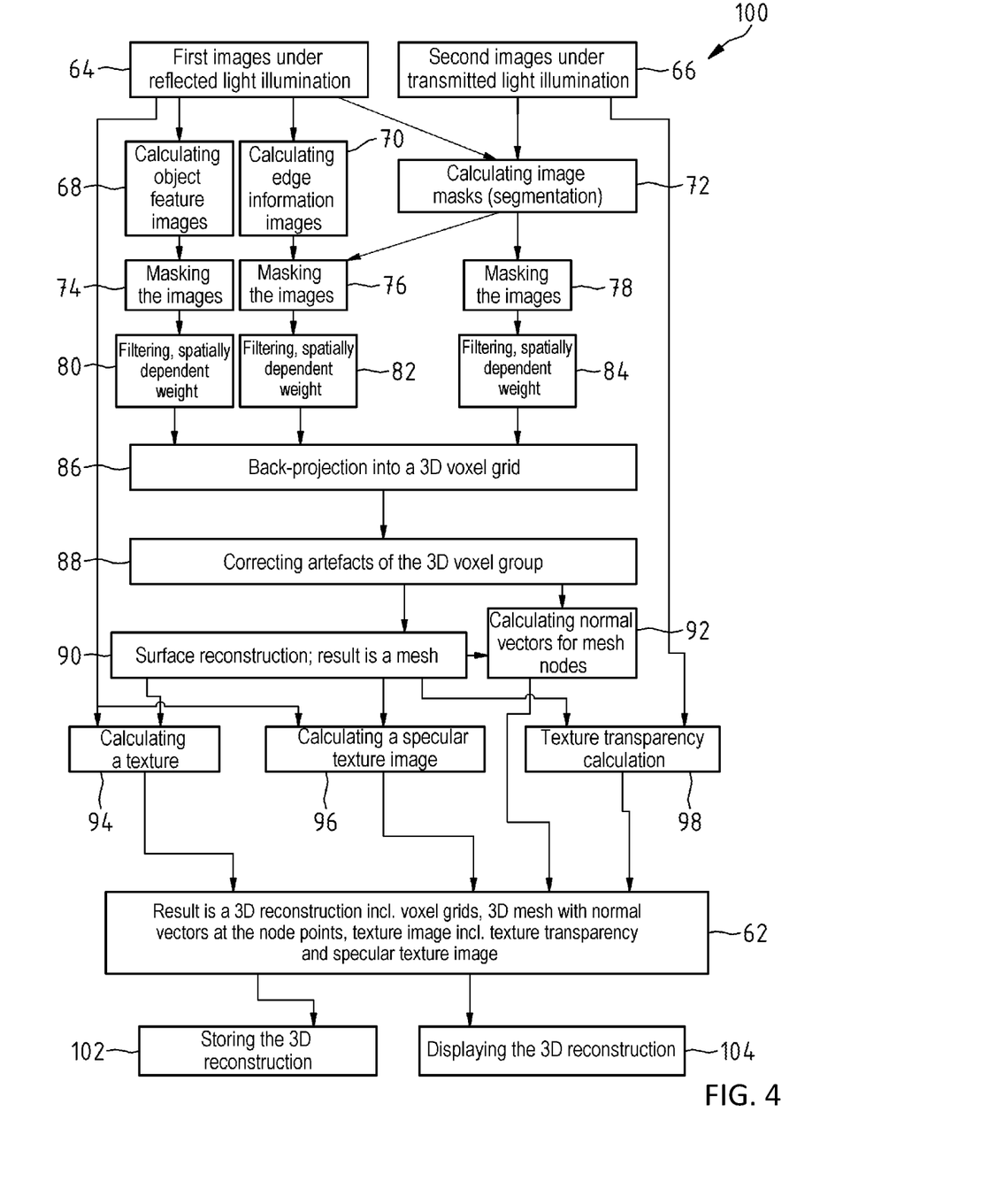
FIG. 4 shows a first algorithm of a computer program for a computer unit in the apparatus for generating a 3D reconstruction of an object.

The algorithm 100 implemented in the computer program in the computer unit 58 for calculating the 3D reconstruction 62 of the object 12 is described below on the basis of FIG. 4. The algorithm 100 facilitates the 3D reconstruction 62 of the object 12 as a tomographic 3D reconstruction.

In a first step, a multiplicity of first images 64 are recorded in various arrangements of the object 12, to be reconstructed, relative to the at least one image capturing device 20, 22, 24, 26, 28, wherein the object 12 is captured with illumination light, at least some of which, in relation to the object imaging beam path 30, 32, 34, and 36, is reflected light which illuminates the object 12. At the same time, a multiplicity of second images 66 are captured for the same arrangements of the object relative to the at least one image capturing device 20, 22, 24, 26, 28. In this case, the object 12 is recorded with illumination light, at least some of which is guided in the object imaging beam path 30, 32, 34, 36 to the at least one image capturing device 20, 22, 24, 26, 28.

Both the first and the second images 64, 66 are filtered, in particular in order to suppress noise or sharpen edges, for example by means of a Gaussian filter, a Ram-Lak filter or a specific filter trained by machine learning. However, it should be noted that an alternative exemplary embodiment of the algorithm may also be embodied without this filtering of the first and second images 64, 66.

In the algorithm 100, firstly object feature images 68 and secondly edge information images 70 are calculated from the first images 64, in which at least some of the object 12 is illuminated by reflected light in relation to the corresponding object imaging beam path.

For the feature images, provision is made in the algorithm 100 for each detected feature to be plotted as a rotationally symmetric spot with, e.g., a Gaussian profile:

$$(x, y) \rightarrow \frac{1}{2\pi\sigma^2} e^{-\frac{(k-x)^2 + (l-y)^2}{2\sigma^2}},$$

where (x, y) represents the sub-pixel accurate pixel coordinates of the respective feature and (k, l) represents the integer pixel coordinates in the feature image. In principle, the width σ of the Gaussian spot can be chosen as desired in this case.

It should be noted that, as an alternative thereto, provision can also be made for a feature image to be an image which emerges from filter responses when generating features by means of a kernel-based detection, as described in the book "Digitale Bildverarbeitung," Springer Verlag, Berlin (1997) by B. Jane, to which reference is hereby made and the disclosure of which is incorporated in the entirety thereof in the present description of the disclosure.

By contrast, image masks 74, 76, and 78 are calculated by means of segmentation in a computation step 72 from the second images 66 which are captured with illumination light, at least some of which is guided in the object imaging beam path to the corresponding image capturing device.

In the case of illumination light, at least some of which is guided in the object imaging beam path 30, 32, 34, and 36 to the at least one image capturing device 20, 22, 24, 26, 28, opaque points of the object 12 appear as black pixels in the image whereas light-transmissive points appear as greyscale values, the intensity of which depends on the light-transmissivity of the object 12. Therefore, all pixels whose intensity deviates significantly from that of the light are assigned a value of 1 in order to calculate the image masks 74, 76, 78. The background of the object feature images 68 and of the edge information images 70 and also of the second images 66 is masked by means of the associated calculated image masks 74, 76, 78, the second images being captured with illumination light, at least some of which is guided in the object imaging beam path to the corresponding image capturing device. Hence, only the pixels located within the image mask 74, 76, 78, i.e., the pixels assigned a value of 1 in the image mask 74, 76, 78, are used for the 3D reconstruction.

A three-dimensional voxel grid is constructed in a next step, the resolution of which, i.e., the number of voxels per spatial direction in the present case, corresponds to the target accuracy for the 3D reconstruction of the object 12. In this case, each box contains two data channels, specifically a data channel for information from the image data of the first images 64 and a data channel for information from the image data of the second images 66.

It should be noted that each voxel will contain up to six data channels in an apparatus where there are image capturing devices for capturing color images, which the algorithm for calculating the 3D reconstruction 62 of the object 12, implemented in the computer program of the computer unit 58, may provide. Each voxel then comprises first data channels for each of the three color channels in relation to images in which at least some of the object 12 is illuminated with reflected light in relation to the corresponding object imaging beam path and second data channels for each of the three color channels in relation to images captured with illumination light, at least some of which is guided in the object imaging beam path to the corresponding image capturing device.

In the algorithm 100, image data belonging to this data channel are back-projected, for each data channel, onto the 3D voxel grid in a computation step 86 and filtered in the process and weighted by means of a weight function 80, 82, 84. To this end, each voxel is projected onto a pixel in all images belonging to the data channel. If, in the process, the pixel onto which the voxel is projected is located within the image mask 74, 76, 78 belonging to the image, its intensity is multiplied by the weight function. Here, the weight function 80, 82, 84 may depend on the location of the considered voxel in the 3D voxel grid and on a pixel onto which the voxel is projected, in particular on the distance of the voxel from the image capturing device 20, 24, 26, 28 when capturing the associated image.

The intensity values weighted by the weight function 80, 82, 84 are summed and the resultant value is assigned the considered voxel of the 3D voxel grid in the respective data channel. In the process, the information from the up to six data channels can be combined by calculation to a 3D voxel grid with only a single data channel.

It should be noted that, on account of a redundancy of the data combined by calculation, errors can be minimized in the calculated 3D reconstruction by virtue of averaging corresponding data within a data channel.

Then, artefacts are corrected for the 3D voxel grid in a next step 88. Filters and/or neural networks can be used to this end. Thereupon, a mesh is calculated from the 3D voxel grid in a further step 90, the mesh describing properties of the surface of the 3D object.

To this end, points with the local intensity maximum determined according to the mean-shift method, as specified in the publication F. Zhou, Y. Zhao, K. Liu Ma, "Parallel mean shift for interactive volume segmentation," Machine learning in medical imaging, Lecture notes in Computer science, 67 to 75 (2010), to which reference is hereby made and the disclosure of which is incorporated in the entirety thereof in the present description of the disclosure.

In the process, the 3D voxel grid is sampled with a fixed increment. To this end, the closest intensity maximum is determined in each step. Here, the visual shell can be used to restrict the search range for the possible intensity maxima. To this end, the following iterative method is chosen: A three-dimensional window function is used, for example as described at the url:

de.wikipedia.org/wiki/Fensterfunktion, where use is made of a Gaussian window, for example. In a first step, the two-dimensional centroid of the values of the 3D voxel grid within this window is determined.

In a second step, the window is shifted to the centroid. These two steps are repeated iteratively until a stable centroid has been reached, i.e., until the movement of the window drops below a threshold in terms of magnitude. It should be noted that this threshold should lie significantly below the target accuracy. In the case of a target accuracy of 0.1 mm, it is possible to choose a threshold of, e.g., 0.01 mm or less, in particular to the maximum achievable computation accuracy. Then, the generated points in the form of local intensity maxima form the sought-after point cloud, as described, e.g., in the published book "Level Set Methods and Fast Marching Methods Evolving Interfaces in Computational Geometry, Fluid Mechanics, Computer Vision, and Materials Science," Cambridge University Press (1999) by J. A. Sethian, to which reference is hereby made and the disclosure of which is incorporated in the entirety thereof in the present description of the disclosure.

As an alternative thereto, the 3D voxel grid could also be binarized using a high pass filter or using global or local adaptive thresholds such that each voxel has a value of 0 or 1. The local adaptive threshold can be calculated on the basis of a local mean or median or quantile. Morphological filters can be used to correspondingly optimize the binarized 3D voxel grid in order to minimize errors. Following the binarization of the 3D voxel grid, the surface of the object to be reconstructed is accurately described by the 0-1 transitions at adjacent voxels in the 3D voxel grid since this is where there is a transition from voxels located outside of the object, with a value of 0, to voxels located within the object, with a value of 1. A 3D point is generated at each of these 0-1 transitions. Then, these surface points form a point cloud representing the surface of the 3D object.

For the purposes of sampling the voxel volume at a fixed increment, a window is cut out in each step and a local threshold is formed, for example on the basis of the mean value or the median or a quantile. To this end, use can be made of Otsu's thresholding method, for example, which is described in the publication M. Sezgin, B. Sankur, "Survey over image thresholding techniques and quantitative performance evaluation," Journal of Electronic Imaging. 13 (1), 146-165 (2004). Here, increment and window size can be chosen to be substantially larger. Optionally, the binarized volume can also be reduced or skeletonized using so-called morphological filters, and the surface can subsequently be extracted. Here, 3D points are generated at the points with a 0→1 transition. Thus, a point cloud can be obtained overall.

To this end, the normal vectors for the mesh nodes are calculated in a calculation routine 92, in particular by application of derivative filters that consider adjacent voxels in the grid. Then, a texture is calculated from the first images 64 and the mesh within a computation routine 94. Moreover, a specular texture image is calculated from the first images 64 and the mesh of a computation routine 96 in the algorithm by virtue of the change in the intensity of the projection of the mesh point in the various captured images or, should color images be captured, the color of the projection of the mesh point into the various captured images being analyzed and, firstly, a diffuse color component and, secondly, a specular color component being estimated therefrom.

It should be noted that the color virtually does not change in a purely diffuse color component. However, in the case of a strongly specular color component, the color changes significantly, depending on the arrangement of the object 12 relative to the at least one image capturing device 20, 22, 24, 26, 28 and the illumination devices. A texture transparency is calculated from the second images 66 in a computation routine 98 in the algorithm 100 by virtue of the intensity of the projection of this point in the various second images 66 being analyzed for each mesh point. The brighter the intensity of the associated pixel, the more light-transmissive the surface is at the point of this mesh point.

The 3D reconstruction 62 of the object 12 emerging from the preceding calculation steps comprises a 3D voxel grid and 3D mesh with normal vectors at the node points, together with a texture which contains a specular texture image and a texture transparency.

The algorithm 100 comprises a storage routine 102 for storing the 3D reconstruction 62 of the object 12, and contains a display routine 104 for displaying the 3D reconstruction 62 of the object 12 on the display 60 in the apparatus 10. Here, various formats lend themselves to storage in order to save as much storage space as possible, in particular efficient storage structures such as so-called octrees, nested grids or bounding volume hierarchies, and methods such as the so-called binary space partitioning. Saving storage space is based on the fact that the visual shell represents the convex shell of the object to be reconstructed. Consequently, only voxels within the visual shell can have a value of 1. All voxels outside of the visual shell have a value of 0 in all data channels. It should be noted that this can achieve a reduction R in the storage space in relation to an original size U, with U≈10% and, inter alia, also 2%≤U≤5%.

Figure 5:
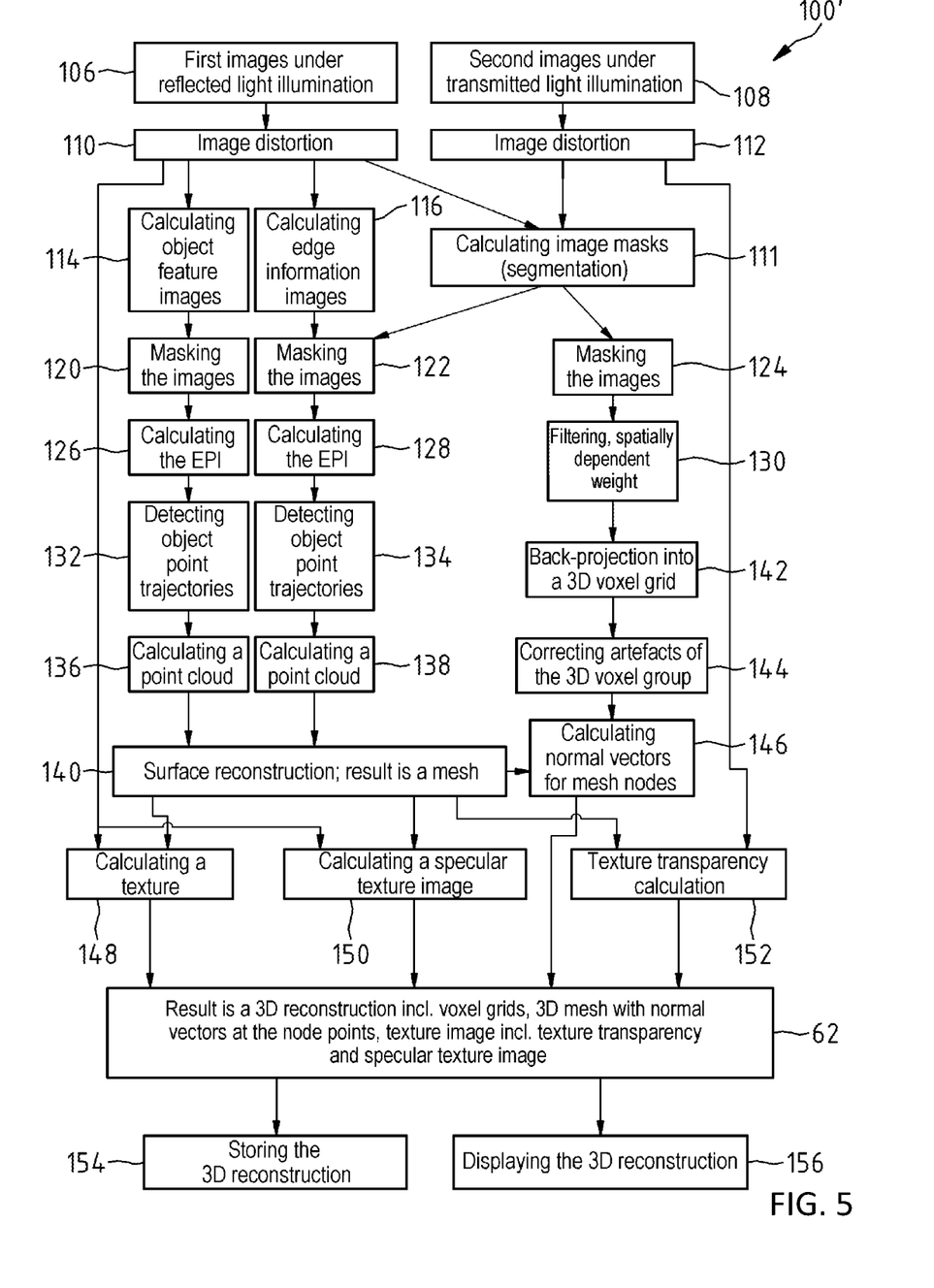
FIG. 5 shows a second algorithm of a computer program for the computer unit in the apparatus for generating a 3D reconstruction of an object.

FIG. 5 serves to explain a further algorithm 100' for a computer program, by means of which a 3D reconstruction 62 of the object 12 can be calculated in the computer unit 58 of the apparatus 10. The algorithm 100' facilitates an epipolar-geometric 3D reconstruction of the object 12.

In a first step of the algorithm 100', a multiplicity of first images 106 are yet again recorded in various arrangements of the object 12 to be reconstructed, relative to the at least one image capturing device 20, 22, 24, 26, 28, wherein the object 12 is captured with illumination light, at least some of which, in relation to the object imaging beam path 30, 32, 34 and 36, is reflected light which illuminates the object 12. At the same time, a multiplicity of second images 108 are recorded in respect of the same arrangement of the object 12 relative to the at least one image capturing device 20, 22, 24, 26, 28, wherein the object 12 is captured with illumination light, at least some of which is guided in the object imaging beam path 30, 32, 34 and 36 to the at least one image capturing device 20, 22, 24, 26, 28. Then, the first and second images are distorted and possibly rectified in the apparatus 10 in a distortion step 110, 112 on the basis of known imaging parameters of the image capturing devices 20, 22, 24, 26, 28.

It should be noted that, in an alternative exemplary embodiment of the algorithm 100', provision can be made for both the first and the second images 106, 108 to be filtered, in particular in order to suppress noise or in order to sharpen edges.

Firstly, object feature images 114 and, secondly, edge information images 116 are calculated from the first images 106, like in the algorithm 100 described above. Once again, image masks 118, 120, 122 are calculated from the second images 108 in a computation step 111 by means of segmentation. A background of both the first and the second recorded images 106, 108 is masked with the aid of the associated calculated image masks 120, 122, 124, and so only pixels located within the image mask, i.e., pixels which are assigned a value of 1 in the image mask, are used for the 3D reconstruction. Now, epipolar plane images 126, 128 are generated here from the object feature images 114 and the edge information images 116, object point trajectories 132, 134 being detected therein. As a result of calculating the gradient of these object point trajectories 132, 134, the depth of the associated 3D point relative to the image capturing device 20, 22, 24, 26, 28 can be deduced by means of known imaging parameters of the associated image capturing device 20, 22, 24, 26, 28. As a result of this, it is possible in each case to calculate a point cloud 136, 138 from the object feature images 114 and the edge information images 116. Redundant information, which can be combined by calculation for the minimization of errors, is available in the present case on account of the use of feature images and edge information images of one and the same object 12.

Then, a mesh 140 is calculated from the point clouds 136, 138 in the algorithm 100'. Like in the algorithm 100 described on the basis of FIG. 3, a back projection 142 onto a 3D voxel grid is calculated by means of a weight function 130, following filtering, from the masked second images 108 in the algorithm 100'.

Artefacts in the voxel grid are corrected in a next step 144. Filters and/or neural networks can be used to this end. Like in the algorithm 100' described on the basis of FIG. 3, the normal vectors for the mesh nodes are calculated in a calculation routine 146, in particular by application of derivative filters that consider adjacent voxels in the grid. Then, a texture is calculated from the first images 106 and the mesh 140 within a computation routine 148. Moreover, a specular texture image is calculated from the first images 106 and the mesh 140 in a computation routine 150 in the algorithm 100' by virtue of, once again in this case, the change in the intensity of the projection of the mesh point in the various captured images or, should color images be captured, the color of the projection of the mesh point into the various captured images being analyzed in order to estimate a diffuse and a specular color component therefrom.

Like in the case of the algorithm 100, there is virtually no change in the case of a purely diffuse color component. By contrast, there is a significant change in the color in the case of a strong specular component depending on the arrangement of the object in relation to the at least one image capturing device 20, 22, 24, 26, 28 and in relation to the light sources 42, 44, 46, 48, and 50, which form a device for illuminating the object 12 with illumination light in the apparatus 10, described on the basis of FIG. 2 and FIG. 3, for generating a 3D reconstruction of an object 12. Then, a texture transparency is calculated from the second images 108 in a computation routine 152 in the algorithm 100 by virtue of the intensity of the projection of this point in the various second images 108 being analyzed for each mesh point. The brighter the intensity of the associated pixel, the more light-transmissive the surface is at the point of this mesh point.

The 3D reconstruction 62 of the object 12 emerging from the preceding calculation steps then once again comprises a 3D voxel grid and 3D mesh with normal vectors at the node points, together with a texture which contains a specular texture image and a texture transparency. The algorithm 100' also comprises a storage routine 154 for storing the 3D reconstruction 62 of the object 12, and contains a display routine 156 for displaying the 3D reconstruction 62 of the object 12 on the display 60 in the apparatus 10.

To sum up, the following typical features of the disclosure should be noted in particular: The generation of a 3D reconstruction 62 of an object 12 comprises illuminating the object 12, capturing image data in relation to the object 12, and calculating the 3D reconstruction 62 of the object 12 from the image data. The image data comprise first image data and second image data, wherein the first image data are captured from different recording directions 30', 32', 34', 36', 38' when the object 12 is illuminated with illumination light 54, at least some of which, in relation to an object imaging beam path 32, 34, 36, 38, is reflected light which illuminates the object 12, wherein the second image data are captured from different recording directions 30', 32', 34', 36', 38' when the object 12 is illuminated with illumination light 54, at least some of which is guided in an object imaging beam path 32, 34, 36, 38, and wherein the 3D reconstruction 62 of the object 12 is calculated from the first image data and the second image data.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

List of reference signs

| | |
|---|---|
| 1 | Epipolar plane image $E_{x,k}(y, t)$ |
| $2^{(1)}, 2^{(2)}, \ldots 2^{(n-1)}, 2^{(n)}$ | Images captured at different times t |
| $4^{(2)}, \ldots 4^{(n)}$ | Epipolar line |

List of reference signs

| | |
|---|---|
| 5 | 3D point |
| 6 | Straight line |
| 10 | Apparatus |
| 12 | Object |
| 14 | Holding arm |
| 15 | Object carrier |
| 16 | Column |
| 18 | Plane |
| 19 | Double-headed arrow |
| 20, 22, 24, 26, 28 | Image capturing device |
| 30, 32, 34, 36, 38 | Object imaging beam path |
| 30', 32', 34', 36', 38' | Recording direction |
| 40 | Coordinate system |
| 42, 44, 46, 48, 50 | Light source |
| 52 | Illuminant |
| 54 | Diffuse illumination light |
| 56 | Mirror |
| 57 | Object side |
| 58 | Computer unit |
| 60 | Display |
| 62 | 3D reconstruction |
| 64 | First images |
| 66 | Second images |
| 68 | Object feature images |
| 70 | Edge information images |
| 72 | Computation step |
| 74, 76, 78 | Image mask |
| 80, 82, 84 | Weight function |
| 86 | Computation step |
| 88 | Next step |
| 90 | Further step |
| 92 | Calculation routine |
| 94, 96, 98 | Computation routine |
| 100, 100' | Algorithm |
| 102 | Storage routine |
| 104 | Display routine |
| 106 | First images |
| 108 | Second images |
| 110 | Distortion step |
| 111 | Computation step |
| 112 | Distortion step |
| 114 | Object feature images |
| 116 | Edge information images |
| 118, 120, 122, 124 | Image mask |
| 126, 128 | Epipolar plane images |
| 130 | Weight function |
| 132 | Object point trajectories |
| 134 | Object point trajectories |
| 136, 138 | Point cloud |
| 140 | Mesh |
| 142 | Back projection |
| 144 | Step |
| 146 | Calculation routine |
| 148, 150, 152 | Computation routine |
| 154 | Storage routine |
| 156 | Display routine |

The invention claimed is:

1. A method for generating a 3D reconstruction of an object, the method comprising:
   illuminating an object with illumination light emanating from a light source configuration containing at least one light source;
   capturing image data in relation to the object, wherein the image data contains first image data and second image data;
   capturing the first image data from different recording directions, the object being illuminated with the illumination light emanating from the light source configuration incident on an optically effective surface of the object, at least some of the illumination light incident on the optically effective surface being reflected into an object imaging beam path;

capturing the second image data from the different recording directions, the object being illuminated with the same illumination light emanating from the light source configuration, at least some of which, in relation to the object imaging beam path, is background light which back-illuminates the object;

analyzing an intensity profile along an object point trajectory to estimate a reflection property of a 3D reconstruction of the object; and calculating the 3D reconstruction of the object from the first image data and the second image data.

2. The method according to claim 1, wherein a tomographic reconstruction of the object, in which the first and second image data are back-projected into a 3D voxel grid according to spatially dependent weighting, is ascertained to calculate the 3D reconstruction of the object.

3. The method according to claim 1, wherein the calculation of the 3D reconstruction of the object comprises a calculation of object feature images for at least some of the first image data.

4. The method according to claim 3, wherein at least one of:
the object feature images have a single object feature or a plurality of object features from a group of edges, corners, Gabor features as a feature;
the object feature images are calculated by machine learning or by a neural network; or the calculation of the 3D reconstruction of the object includes a determination of segmented image masks and the cutting of an object part from at least some of at least one of the first image data or the second image data with segmented image masks.

5. The method according to claim 3, wherein the calculation of the 3D reconstruction of the object comprises a calculation of edge information images from the at least one of the first image data or the second image data.

6. The method according to claim 5, wherein the calculation of the 3D reconstruction of the object comprises a calculation of epipolar plane images from at least one of the object feature images or the edge information images.

7. The method according to claim 6, wherein the calculation of the 3D reconstruction of the object comprises the calculation of object point trajectories from the epipolar plane images and the measurement of the gradient of the calculated object point trajectories and the estimation of depth information by means of triangulation to form an epipolar geometric 3D reconstruction of the object.

8. The method according to claim 7, wherein a tomographic reconstruction of the object, in which the first image data and the second image data are back-projected into a 3D voxel grid following spatially dependent weighting, is ascertained for the purposes of calculating the 3D reconstruction of the object, and wherein the epipolar geometric 3D reconstruction of the object is combined by calculation with the 3D voxel grid to form the 3D reconstruction of the object.

9. The method according to claim 7, wherein at least one of:
a mesh for describing the surface of the object is calculated from the 3D voxel grid, or mesh normals are calculated from the 3D voxel grid with a derivative filter.

10. The method according to claim 1, further comprising performing at least one of:
calculating a texture transparency from the second image data, wherein the 3D reconstruction of the object contains information of the calculated texture transparency; calculating a specular texture image, wherein the 3D reconstruction of the object contains information of the calculated texture image;

capturing color images as images with image data;

determining the 3D reconstruction of the object by combining by calculation a plurality of the 3D color channel reconstructions of the object, wherein each of the 3D color channel reconstructions is calculated for at least one of a color channel or a texture transparency channel from the first image data and the second image data;

determining a 3D reconstruction having texture information; and reflecting a view of the object into the image capturing device.

11. The method according to claim 10, further comprising:
averaging corresponding data within the at least one of the color channel or the texture transparency channel.

12. The method according to claim 1, wherein the calculation of the 3D reconstruction of the object comprises a calculation of a visual shell from silhouettes of the object calculated from the second image data.

13. The method according to claim 1, further comprising: capturing the first image data and the second image data at a same time.

14. The method according to claim 1, wherein the at least one light source contains an areal illuminate configured to provide diffuse illumination light, and illuminating the object with the diffuse illumination light.

15. An apparatus for generating a 3D reconstruction of an object, the apparatus being configured to carry out the method according to claim 1 and comprising:
a device configured to illuminate with the object with the illumination light;
a device configured to capture the first image data and the second image data of the object; and
a device configured to calculate the 3D reconstruction of the object from the first image data and the second image data.

16. A non-transitory storage medium having a computer program stored thereon and comprising commands that, when executed on a computer, cause an apparatus for generating a 3D reconstruction of an object to carry out the method of claim 1,
wherein the apparatus contains:
a device configured to illuminate the object with the illumination light;
a device configured to capture the first image data and the second image data of the object; and
a device configured to calculate the 3D reconstruction of the object from the first image data and the second image data.

17. An apparatus for generating a 3D reconstruction of an object, the apparatus comprising:
a device configured to illuminate an object with illumination light emanating from a light source configuration containing at least one light source;
a device configured to capture image data in relation to the object; and a device configured to calculate the 3D reconstruction of the object from the captured image data,
wherein the captured image data include first image data and second image data,
wherein the first image data are captured from different recording directions, the object being illuminated with the illumination light emanating from the light source configuration incident on an optically effective surface of the object, at least some of the illumination light incident on the optically effective surface being reflected into an object imaging beam path, wherein the second image data are captured from the different recording directions, the object being illuminated with the same illumination light, at least some of which, in relation to the object imaging beam path, is background light which back-illuminates the object, wherein a reflection property of the 3D reconstruction of the object is estimated by analyzing an intensity profile along an object point trajectory, and wherein the 3D reconstruction of the object is calculated from the first image data and the second image data.

18. The apparatus according to claim 17, wherein the device configured to capture image data in relation to the object is further configured to capture the first image data and the second image data at a same time.

19. The apparatus according to claim 17, wherein the at least one light source contains an areal illuminate configured to provide diffuse illumination light, and wherein the device configured to illuminate the object is further configured to illuminate the object with the diffuse illumination light.

20. The apparatus according to claim 17, wherein the device configured to calculate the 3D reconstruction of the object is further configured to average corresponding data within at least one of a color channel or a texture transparency channel.

* * * * *

UNITED STATES PATENT AND TRADEMARK OFFICE
CERTIFICATE OF CORRECTION

PATENT NO. : 12,033,280 B2
APPLICATION NO. : 16/860006
DATED : July 9, 2024
INVENTOR(S) : Oliver Schwarz and Lars Omlor It is certified that error appears in the above-identified patent and that said Letters Patent is hereby corrected as shown below:

In the Specification

In Column 8, Line 5: change "Use f" to -- Use of --

In Column 16, Line 65: change "Jane" to -- Jähne --

In the Claims

In Column 24, Line 33, Claim 15: change "with the object" to -- the object --

In Column 25, Line 19, Claim 19: change "illuminate" to -- illuminant --

Signed and Sealed this
Sixth Day of August, 2024

Katherine Kelly Vidal
*Director of the United States Patent and Trademark Office*